United States Patent [19]
Lawson

[11] 3,912,879
[45] Oct. 14, 1975

[54] CONTINUITY AND TONE TEST SET
[76] Inventor: William J. Lawson, P.O. Box 711, Poteet, Tex. 78065
[22] Filed: May 30, 1974
[21] Appl. No.: 474,563

[52] U.S. Cl.................................. 179/175; 324/51
[51] Int. Cl.² ........................................ G01R 31/02
[58] Field of Search........ 179/175, 175.3 R; 324/51, 324/62; 331/108 A, 111

[56] References Cited
UNITED STATES PATENTS

| | | |
|---|---|---|
| 3,551,796 | 12/1970 | Holder et al........................... 324/51 |
| 3,711,661 | 1/1973 | Garrett et al. ............... 179/175.1 R |
| 3,758,855 | 9/1973 | Meyer.................................... 324/51 |
| 3,826,977 | 7/1974 | Woodworth.......................... 324/51 |

Primary Examiner—Kathleen H. Claffy
Assistant Examiner—Douglas W. Olms
Attorney, Agent, or Firm—Joseph E. Rusz; Henry S. Miller, Jr.

[57] ABSTRACT

An oscillating circuit which remains inactive until a connection is made between two leads causing a tone in an attached speaker. Variations in resistance between the two leads alters the audio output at the speaker.

1 Claim, 2 Drawing Figures

CONTINUITY AND TONE TEST SET

BACKGROUND OF THE INVENTION

This invention relates generally to electrical testing devices and more particularly to audio continuity and circuit identification test equipment.

Current equipment and test proceedures require that when electrical circuitry is checked for continuity or identification, two operators must be placed one at either end of the circuit and, utilizing headsets, identify each circuit. Generally, this is done by verbially communicating through the head set until the wires are located. After identification, other equipment is connected to determine the difficulty with the line in the event of continuity testing.

In an alternative method, a buzzer type test device is used. This method requires a test set to be connected at one end, turned on and adjusted for volume. Upon shorting of the wires, a buzzer is heard by the operator. Additional equipment is then required to determine the nature and extent of any malfunctions in the circuit.

Existing equipment has shown to be generally less reliable than could be expected. Battery powered, the test equipment has short battery life in that it must remain "on" and consume current until turned "off" after the test sequence is completed. Deteration in battery condition effects the reliability of test results. There is a high wearout rate of this equipment as well as undesirable side effects such as radio frequency interference from arcing buzzer contacts. In addition, when testing telephone circuits, the buzzing tone will cross to other wires in the cable and disturb conversations on other lines. Further, existing tone test equipment is limited in the range of resistances with which it operates and is generally limited to low resistance.

SUMMARY OF THE INVENTION

The continuity and tone test set proposed therein avoids the disadvantages of the prior art. The test set utilizes an oscillator circuit that functions only when a circuit is completed by the wires tested. As a result, the test set utilizes current only when the circuit is completed and may be positioned in remote areas for long periods without supervision or maintenience. Further, the invention requires no volume or "on-off" control. In addition, a skillful operator is able to identify circuit problems by observing the volume and frequency of the audible tone from the test set.

In the test set is included a loud speaker for producing an audible tone for identification purposes. The speaker is connected to a circuit that produces a relaxation oscillator effect when the circuit is completed through some external means. The entire test unit is enclosed in a non-breakable plastic case with a pair of binding post contacts mounted thereon.

It is therefore an object of the invention to provide a new and improved continuity and tone test set.

It is another object of the invention to provide a new and improved continuity and tone test set that will operate over a wide range of resistances.

It is a further object of the invention to provide a new and improved continuity and tone test set that does not require volume or switch components.

It is still another object of the invention to provide a new and improved continuity and tone test set that has long battery life.

It is still a further object of the invention to provide a new and improved continuity and tone test set that will allow an operator to determine the nature of the malfunction without additional test equipment.

It is another object of the invention to provide a new and improved continuity and tone test set that is light in weight and compact in size.

It is another object of the invention to provide a new and improved continuity and tone test set that does not interfere with other electrical and electronic equipment in the vicinity of its operation.

It is another object of the invention to provide a new and improved continuity and tone test set which is economical to produce and utilizes conventional, currently available components that lend themselves to standard mass production manufacturing techniques.

These and other advantages, features and objects of the invention will become more apparent from the following description taken in connection with the illustrative embodiment in the accompanying drawing.

DESCRIPTION OF THE DRAWINGS

Referring now to FIG. 1, the continuity and tone test set is shown generally at 10. The case consists of a strong reinforced plastic 12 having a vented front panel 14 behind which a loudspeaker is located. An identification plate 16 is positioned below the speaker outlet. On the top surface 8 of the case are two binding posts 20 and 22. The binding posts are used to connect the test set to the leads to be tested, as for example, telephone pairs.

FIG. 2 shows the circuit of the invention. A battery 20 supplied current for the circuit and may be two size AA penlite cells producing 3 volts DC. The plus side of the battery is fed along line 22, through biasing resistor 24 to one binding post 26. The emitter 28 of the PNP transistor 30 draws from line 22 as well as line 32 to the feed back capacitor 34. The negative side of the battery is connected via line 36 to speaker 38. Line 40 is connected between the battery and the speaker to the emitter 42 of WPN transistor 44. The collector 46 of transistor 30 is connected via line 48 to line 50, connecting the speaker 38 to the capacitor 34.

Figure 1:
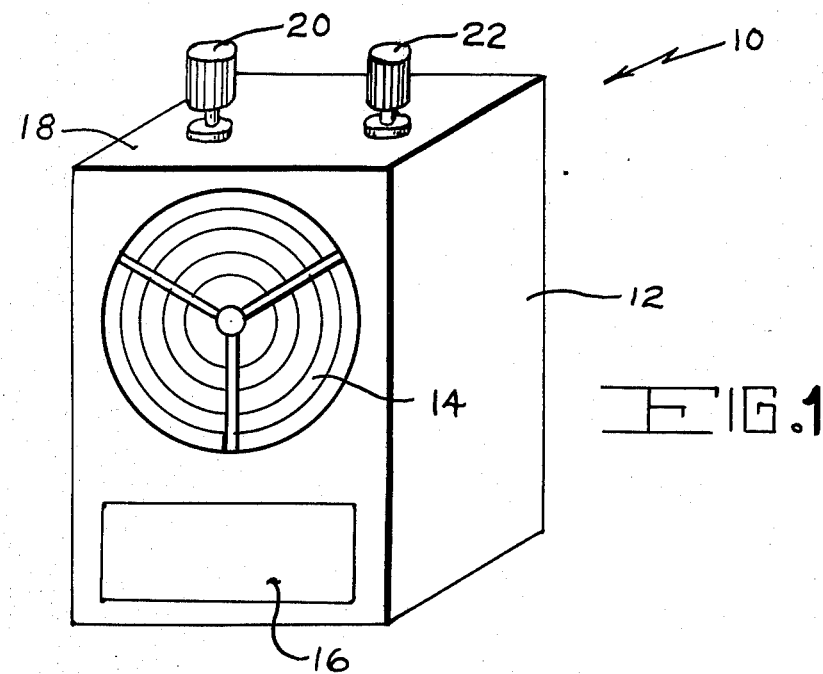
FIG. 1 is a perspective view of the invention.
Figure 2:
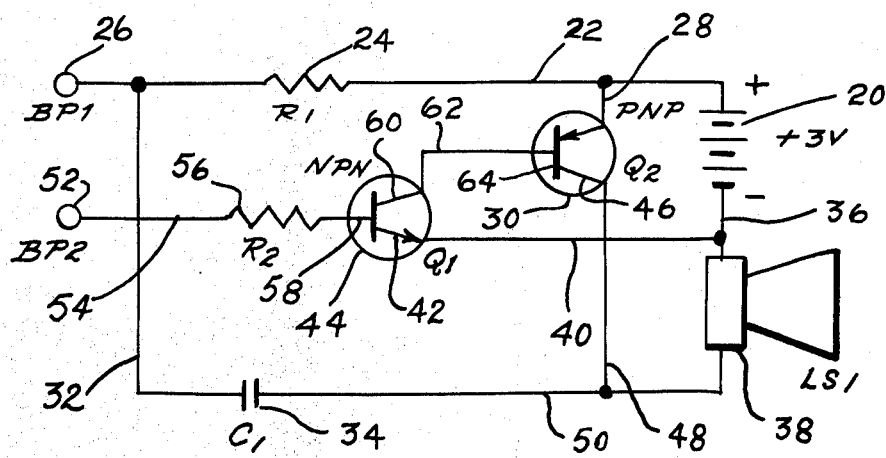
FIG. 2 is a circuit diagram of the invention.

Binding post 52 is connected via line 54 through biasing resistor 56 to the base 58 of transistor 44. Collector 60 of transistor 44 is connected by line 62 to the base 64 of transistor 30.

In operation the circuit is not operative until binding posts 26 and 52 are connected. When the binding posts are connected either directly or through a resistance, the circuit functions as a relaxation oscillator causing an output in the speaker. Varying the resistance across the binding posts causes a variance in the audio output as shown in the following table.

TEST RESULTS
Task 439

| Resistance Across Binding Posts | Output Frequency | Audio Output |
| --- | --- | --- |
| (Short) Zero Ohms | 291 Hs | 100 Milli-Volts |
| 20 Ohms | 289 Hs | 110 mV |
| 50 Ohms | 287 Hs | 140 mV |
| 100 Ohms | 283 Hs | 170 mV |
| 200 Ohms | 278 Hs | 210 mV |

-Continued

TEST RESULTS
Task 439

| Resistance Across Binding Posts | Output Frequency | Audio Output |
|---|---|---|
| 500 Ohms | 266 Hs | 330 mV |
| 1,000 Ohms | 254 Hs | 450 mV |
| 2,000 Ohms | 242 Hs | 500 mV |
| 5,000 Ohms | 464 Hs | 700 mV |
| 10,000 Ohms | 756 Hs | 1100 mV |
| 20,000 Ohms | 840 Hs | 1150 mV |
| 50,000 Ohms | 33.71 kHz | 1500 mV |

It is easily seen that a direct short between the binding posts will produce an audio output of 200 milli-volts whereas a resistance of 50,000 ohms will produce a 1500 milli volt audio output. The scale between 0 and 50,000 ohms is continuous and allows for a wide range of applications.

Although the invention has been described with reference to a particular embodiment, it will be understood to those skilled in the art that the invention is capable of a variety of alternative embodiments within the spirit and scope of the appended claims.

I claim:

1. A continuity and tone test set comprising: a housing, an opening in one side of said housing; a pair of binding posts mounted on a second side of said housing; an electrical circuit mounted within the housing and connected to the binding posts, said circuit including, a battery, a first resistor connected between the battery and the first binding post, a loud speaker connected to said first binding post through a capacitor, a first transistor having its emitter connected to the positive battery output and its collector connected to one side of said loud speaker, a second transistor, a second resistor connected between the second binding post and the base of the second transistor, means connecting the collector of said second transistor and the base of said first transistor, means connecting the negative terminal of the battery to the loud speaker, and means connecting the emitter of said second transistor to the battery-loud speaker connecting means whereby a connection between the first and second binding posts will produce an audio output at the loud speaker.

* * * * *